Patented Apr. 2, 1935

1,996,391

UNITED STATES PATENT OFFICE 1,996,391

OIL SOLUBLE DYESTUFFS

Joseph Straus, New York, N. Y.

No Drawing. Application May 9, 1931,
Serial No. 536,313

5 Claims. (Cl. 8—6)

This invention relates to new dyestuffs, particularly dyestuffs which are soluble in or may be readily dispersed throughout oils, fats, waxes, rubber solvents, and other bodies of similar nature which as a rule do not mix readily with water.

The invention also relates to a method of coloring materials of the nature described, and to a method of obtaining optically clear dispersions of dyestuffs and particularly water soluble dyestuffs throughout substances of the class described. There is a great need for dyestuffs susceptible to dispersion throughout oily or fatty bodies or liquids and the purposes of the dispersions form more or less under three general headings: (1) Where it is desirable to color an oily or fatty body of which colored motor fuels and colored paraffin or stearic acid candles are examples; (2) For coloring a body or liquid of the class described for the purpose of coloring some other material with it in which production of wood stains, and the dyeing of textiles without shrinkage are examples; (3) Where the oily or fatty material is a vehicle in which some other substance is dissolved or dispersed, of which colored rubber solvents are an example.

The oil soluble colors which are at present available for the general purposes outlined above are limited in number and shades of color available. Moreover, a great many of them possess very inferior light resisting properties and as a class they are quite expensive in relation to their fields of usage. They are particularly expensive in comparison with the cost of many of the water soluble dyestuffs. All of these factors have limited the fields of usage of oil soluble colors very materially.

On the other hand, the water soluble dyestuffs can be obtained in almost an indefinite variety of colors and shades and with varying degrees of light fastness. These water soluble dyestuffs, however, are not soluble in oils, fats, waxes or the like, nor have any means or methods heretofore been known by which they could be dispersed throughout oils and the like.

Therefore, one object of this invention is to provide a new series of dyestuffs which are not only water soluble, but which are likewise soluble in oils, fats, waxes and the like.

Another object of the invention is to provide a method of establishing a stable dispersion of oil insoluble dyestuffs throughout oils, fats, waxes and the like.

Another object of the invention is to provide a method of dispersing water soluble dyestuffs in oily bodies.

Another object of the invention is to provide a new series of dyestuffs which give optically clear dispersions in oily bodies.

Another object of the invention is to provide a new colloidal construction of matter capable of selective color carrying properties.

I have determined that it is possible to disperse water soluble, oil insoluble dyestuffs throughout oily bodies by incorporating the dyestuff with oil soluble materials which are also colloidally water soluble.

Otherwise expressed, I have discovered that there exist a class of colloidally water soluble bodies which can be dissolved in oil and will carry into oil solution, water soluble, oil insoluble dyestuffs. This can be accomplished by thoroughly incorporating the dyestuff with appropriate quantities of water and the oil soluble dispersing agent, by grinding, heating or stirring, and either dissolving the resulting product in gasoline or oil, or heating the product until the water has been driven off and dissolving the dry product. Clear solutions are obtained from which the color cannot usually be removed by settling, filtration or washing with water.

Dispersing agents suitable for use with mixes containing water must possess the power of absorbing a substantial quantity of water without separating from it and without losing the essential property of dissolving in oil. For use by either method the dispersing agents should possess sufficient attraction for water soluble dyestuffs to enable the dispersing agent to carry the dyestuff into oil solution.

Some of the materials which possess these properties to a greater or lesser degree and can be used successfully are the various sulfonated fatty oil aromatic compounds similar to the original Twitchell reagent compound, the oil soluble sulfonated vegetable oils, the synthetic fat splitting agents such as the hydrogenated and sulfonated naphthalene and anthracene compounds, the various oil soluble soaps prepared from fatty acids and basic organic nitrogen compounds as exemplified by triethanolamine, stearate and oleate and the naphthenic acids and the oxidized or oxidized and sulfonated products derived from petroleum, and the similar products derived from brown coal tar and similar products.

However, by far the best dispersing agents are the oil soluble mineral oil sulfonates, usually derived from petroleum. The mineral oil sulfonates are produced commercially as by-products of the operation of refining petroleum to produce the medicinal white oils or light colored technical oils by treating the petroleum or fractions thereof with fuming sulfuric acid and/or sulfur trioxide.

After the sulfonation two layers are formed, the A layer or oil layer, and the B layer or sludge layer. The most readily oil soluble mineral oil sulfonates are extracted from the A layer by the well known Petroff-Humphries process. The products produced commercially by the Petroff-Humphries process contained numerous impurities and the purer mineral oil sulfonates can be obtained in a more pure form by additional alcoholic extractions as disclosed, in the Fischer and Reddish Patent No. 1,703,838, issued February 26, 1929.

Generally speaking, the products obtained by the Petroff-Humphries process are called mahogany sulfonates or mahogany soap and the purified product for convenience is termed true mahogany in that it possesses and displays colloidal powers and behavior somewhat different from the impure product.

The oil soluble mineral oil sulfonates or mahogany sulfonates are colloidally soluble in water, soluble in all proportions in oil, and either alone or mixed with oil have the capacity to absorb approximately their own weight of water and still retain their oil solubility. They also seem to possess a particular affinity for the water soluble dyestuffs in the absence of water almost appearing to act as solvents for the dyestuff, and therefore these mahogany sulfonates, and particularly true mahogany, are the most desirable dispersing agents for practicing these methods of coloring oily, fatty and waxy materials.

The most desirable method of using the dispersing agents is dependent upon the nature and characteristics of the particular dyestuff, being used. If the dyestuff dissolves easily in water without forming sticky agglomerates it is desirable to first dissolve the dyestuff in the water and then add the dispersing agent to the water solution. In case the dyestuff tends to become gummy when dissolved in a small amount of water, it is preferable to first grind the dyestuff with the dispersing agent and then gradually add water.

In case it is desirable to avoid dehydration, the amount of water which can be used is dependent upon the ability of the particular dispersing agent to absorb water and carry it into oil. If too great a quantity of water is used the resulting solution will be cloudy and will slowly settle. The amount of dyestuff which can be used is governed by the solubility of the particular dyestuff in water. If too great a quantity is used the undissolved particles will settle out of solution.

In some cases the mixes containing water have been found to be more stable than the dehydrated mixes while with other dyes and oils the dehydrated mixes are more desirable and often from the nature of the material are necessary.

The following examples indicate several convenient and effective ways of carrying out my invention, but it is to be understood that the invention is not limited thereto.

*Example 1*

Two parts of patent blue A, Color Index #714 are ground with a mixture of 10 parts of purified oil soluble mineral oil sulfonate and 12 parts of white oil. Ten parts of water are added with thorough mixing. One part of this mixture dissolved in 100 parts of gasoline gives a deep blue clear solution, the actual dyestuff concentration being fifty-eight parts in 100,000. This can be diluted to give a dyestuff concentration of one part in 100,000 parts of gasoline, which still gives a sufficient depth of blue to distinctly identify a gasoline.

*Example 2*

Two parts of acid violet, Color Index #698, are dissolved in 20 parts of water and 44 parts of a mixture of 20 parts of purified oil soluble mineral oil sulfonate and 24 parts of white oil are stirred in thoroughly and heated until the water is driven out. One part of the paste thus formed is dissolved in 2000 parts of gasoline giving a distinctive purple color. Water can be added or the gasoline filtered through filter paper without affecting the color.

*Example 3*

Two parts of Rhodamine B, Color Index #749, dissolved in 40 parts of water and 80 parts of a mixture of 50% purified oil soluble sulfonate and 50% paraffin oil stirred in. This paste is dissolved in gasoline with stirring and gives a bright pink solution with a yellowish fluorescence with concentrations of dyestuff as low as one part in 100,000 parts of gasoline. Mixtures of pastes prepared from Kiton red, Color Index #680 and Methyl violet, Color Index, #680, by the method given above, with the Rhodamine paste gives a purplish and old rose fluorescent effect.

*Example 4*

Two parts of direct black CxR are dissolved in 20 parts of water and 44 parts of a mixture of 20 parts of purified oil soluble sulfonate and 24 parts of mineral oil. This paste is dissolved in gasoline to give a black in concentrated solution and metallic appearance in dilute solution.

*Example 5*

Coloring of lubricating oils.

From ⅛ to 1% of any of the dyestuffs pastes whose preparations are described in Examples 1, 2 and 3, can be used to color oils such as motor oils, for identification purposes. The dyes are most effective when used on the lighter colored oils and greater quantities are necessary with the greener oils.

*Example 6*

From 1 to 2% of patent blue A paste prepared as described in Example 1, is dissolved in nitrocellulose lacquer. A transparent blue film is formed on drying without precipitation of dye or cloudiness.

*Example 7*

Two parts of the paste dispersions described in Examples 1, 2 and 3 are dissolved in 100 parts of dry cleaning naphtha. White silk is tinted blue, violet and pink respectively, after 1 to 2 minutes immersion. .05 parts of acetic acid added to the solutions produces a deeper color. The dyeings produced in this manner are not fast to washing but are suitable for tinting goods in the dry cleaning process which are not to be subjected to washing.

*Example 8*

Four parts of acid green paste dissolved in 100 parts of turpentine or petroleum solvent will stain wood a light green which is not removed by water.

Example 9

Two parts of acid green are incorporated in 40 parts of triethanolamine oleate and 10 parts of water added. The mixture is dissolved in gasoline and gives a green solution.

Example 10

Two parts of methyl violet are ground in 40 parts of synthetic fat splitter, consisting mainly of hydrogenated, sulfonated, anthracene, which has been neutralized with a suitable alkali. Fifteen parts of water are incorporated in the mixture. The resulting paste dissolved slowly in gasoline to give a violet solution.

Throughout this description and throughout the following claims, the terms "oil" and "oil soluble" have been used to contrast with water and water soluble. It is to be understood, however, that the term oil is meant to include oils, fats, greases, waxes and similar bodies which are soluble in oil or mixable with oil and is meant to include gasoline, benzine, naphtha, white oil, lubricating oil, vasoline, paraffin oil, all petroleum products, stearic acid, vegetable oils, animal oils and the like.

It is to be understood that the invention is not limited to specific features and details herein described but can be carried out in other ways without departure from its spirit as defined by the following claims.

Having described my invention, I desire to be limited only by the following claims:

1. The method of preparing oil insoluble dyestuffs for dispersion throughout oil, said method, comprising, mixing said dyestuffs with oil soluble mineral oil sulfonates in the presence of water, dehydrating the resulting body.

2. The method of dispersing oil insoluble dyestuffs throughout oil, said method, comprising, mixing said dyestuffs with oil soluble mineral oil sulfonates in the presence of water, dehydrating the resulting body, and then dissolving the mixture in oil.

3. A new dyestuff adapted to color oils, said dyestuff comprising an intimate admixture of mahogany sulfonic bodies and a water soluble dyestuff.

4. The method of coloring oils with dyestuffs normally water soluble but oil insoluble, said method, comprising, forming an intimate admixture of a dyestuff of the class specified, water, and mahogany sulfonic bodies, and thereafter dissolving said admixture in the oil to be colored.

5. A new dyestuff adapted to color oils, said dyestuff comprising an intimate admixture of mahogany sulfonic bodies, moisture, and a water soluble dyestuff.

JOSEPH STRAUS.